(12) United States Patent
Schumann

(10) Patent No.: US 6,383,433 B1
(45) Date of Patent: May 7, 2002

(54) COPOLYESTER FIBERS

(75) Inventor: Heinz-Dieter Schumann, Maintal (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/906,577

(22) Filed: Jul. 13, 2001

Related U.S. Application Data

(62) Division of application No. 09/353,165, filed on Jul. 14, 1999, now Pat. No. 6,261,686.

(30) Foreign Application Priority Data

Sep. 10, 1998 (DE) .......................................... 198 41 375

(51) Int. Cl.$^7$ ........................... B29C 47/88; C08G 63/68
(52) U.S. Cl. .................. 264/211.12; 528/287; 528/296; 528/301; 528/302; 528/308.6; 524/81; 524/710; 428/364; 264/176.1
(58) Field of Search .................................. 528/287, 296, 528/301, 302, 308.6; 524/81, 710; 428/364; 264/176.1, 211.12

(56) References Cited

U.S. PATENT DOCUMENTS

| | | |
|---|---|---|
| 4,086,208 A | 4/1978 | Murayama et al. |
| 4,940,559 A | 7/1990 | Kretschmann et al. |
| 5,340,517 A | 8/1994 | Koschinek et al. |
| 5,756,033 A | 5/1998 | Schumann et al. |

FOREIGN PATENT DOCUMENTS

| | | |
|---|---|---|
| DE | 1266922 | 2/1962 |
| WO | WO 92/13120 | 8/1992 |

*Primary Examiner*—Samuel A. Acquah
(74) *Attorney, Agent, or Firm*—McDonnell Boehnen Hulbert & Berghoff

(57) ABSTRACT

The present invention provides a copolyester fiber consisting of a copolyester with primarily $C_{2-4}$ alkylene terephthalate units and a process for producing these copolyester fibers.

The copolyester contains more than 4 wt % up to 12 wt % poly($C_{2-4}$ alkylene glycol) units and 60 to 260 ppm pentaerythritol units and/or a total of 150 to less than 2500 ppm carboxy methylene phosphonic acid units and/or carboxy ethylene phosphonic acid units polymerized into it.

6 Claims, No Drawings

COPOLYESTER FIBERS

This is a divisional of application Ser. No. 09/353,165, filed Jul. 14, 1999, now U.S. Pat. No. 6,261,686.

BACKGROUND OF THE INVENTION

1. Field of the Invention

This invention concerns a copolyester fiber consisting of a copolyester with mainly $C_2$–$C_4$ alkylene terephthalate units, poly($C_2$–$C_4$ alkylene glycol) units, and units derived from polyfunctional compounds (pentaerythritol and/or carboxy methylene phosphonic acid and/or carboxy ethylene phosphonic acid), as well as a process for synthesis of these copolyester fibers by esterification, subsequent precondensation and polycondensation of terephthalic acid with $C_2$–$C_4$ alkylene glycol, poly($C_2$–$C_4$ alkylene glycol), and a polyfunctional compound as well as spinning the resulting polyester in the melt at spooling speeds of at least 3000 m/min.

2. Summary of the Related Art

Copolyester fibers are known. Examined German Patent No. 1,266,922 discloses a process for producing fibers by melt spinning a modified polyester of terephthalic acid or isoterephthalic acid or the dimethyl esters thereof, ethylene glycol, 0.05 to 4.0 mol% alkoxy polyalkylene glycol and 0.05 to 2.4 mol % of a polyhydroxy compound such as pentaerythritol. The fibers or filaments of this modified polyester are essentially free of discoloration.

U.S. Pat. No. 5,756,033 describes a process for producing POY fibers from a polyester containing approximately 150 to 2500 ppm carboxy ethylene phosphonic acid units. The polyester may also contain up to 10 wt % other co-monomers, including polyglycols with a molecular weight of less than 1000. This patent does not disclose any relationship to the dyeing properties of the fibers or how to optimize them.

U.S. Pat. No. 4,086,208 also describes a flame-retardant polyester containing at most 10 mol % polyethylene glycol units and at least 2500 ppm carboxy ethylene phosphonic acid units.

It is also known that fibers of polyesters can be pigmented with disperse dyes. However, there are technical problems associated with dyeing because it is difficult for the large molecules of the disperse dyes to penetrate and diffuse into the amorphous portions of the partially crystalline polyester. Fibers of unmodified polyethylene terephthalate are therefore dyed at temperatures above 120° C. and under excess pressure. However, it is also possible to add organic chemicals that penetrate like plasticizers into the polyethylene terephthalate, causing it to swell and thus making it more readily accessible for dyes. A disadvantage of this, however, is that the added organic chemicals are usually toxic substances that cause severe wastewater pollution.

International Patent Application WO 92/13120 discloses fine, non-delustered fibers that can be dyed at atmospheric pressure without chemical additives, the fibers consisting of a polyethylene terephthalate containing 3.9 wt % polyethylene oxide and 0.175 wt % trimethylol propane which must not contain any delustering agents. A disadvantage of these fibers with regard to uniform spinnability is the high trimethylol propane content. In addition, most applications require delustered fibers.

SUMMARY OF THE INVENTION

The present invention provides a copolyester fiber that can be dyed relatively easily with disperse dyes. The dyed fibers have a relatively high dye receptivity with minimal streakiness at the same time. The invention also provides a process for producing said copolyester fibers.

The invention is described in greater detail below. All patents and other publications are hereby incorporated by reference in their entirety.

DETAILED DESCRIPTION OF THE PREFERRED EMBODIMENTS

The polyester fibers of the invention are obtained by polymerizing more than 4 wt % up to 12 wt % poly($C_{2-4}$ alkylene glycol) units and 60 to 260 ppm pentaerythritol units and/or a total of 150 to less than 2500 ppm carboxy methylene phosphonic acid units and/or carboxy ethylene phosphonic acid units into the copolyester. The amounts given in ppm are based on the total copolymer. It has surprisingly been found that by adjusting the quantity ranges of pentaerythritol units to 60 to 260 ppm and/or of carboxy methylene and/or ethylene phosphonic acid units to a total of 150 to less than 2500 ppm, the dye receptivity of the copolyester fibers can be increased while there is a simultaneous reduction in streakiness. In this way it is also possible to avoid the detrimental effects of using toxic It substances (carriers) when dyeing fibers with disperse dyes.

In a preferred embodiment of this invention 80 to 200 ppm pentaerythritol units and/or a total of 500 to 750 ppm carboxy methylene phosphonic acid units and/or carboxy ethylene phosphonic acid units are polymerized into the copolyester. According to another preferred embodiment of this invention, the amount of poly($C_{2-4}$ alkylene glycol) units is 5 to 9 wt %. According to another preferred embodiment of this invention, the number average molecular weight of the polyalkylene glycol units is between 200 and 3000 g/mol. When these quantity limits are maintained, an optimum is achieved with respect to dyeing properties, mechanical properties, and processing properties of the fibers.

The invention also comprises a process for producing a copolyester fiber, where more than 4 wt % up to 12 wt % poly($C_{2-4}$ alkylene glycol) with a number average molecular weight between 200 and 3000 g/mol and 60 to 260 ppm pentaerythritol and/or a total of 150 to less than 2500 ppm carboxy methylene phosphonic acid and/or carboxy ethylene phosphonic acid is added to the reaction mixture before precondensation. The copolyester fibers produced by this process have proven especially advantageous for dyeing with disperse dyes, yielding a high dye receptivity as well as low streakiness.

According to another embodiment of this invention, pentaerythritol and/or carboxy methylene phosphonic acid and/or carboxy ethylene phosphonic acid and optionally a poly ($C_{2-4}$ alkylene glycol) are added when 50% to 95% of the carboxyl groups of the dicarboxylic acid(s) of the esterification mixture are esterified. If addition of these substances is postponed until this time, development of long chain branching is guaranteed. This long chain branching leads to a change in the viscoelasticity of the copolyester, i.e., the polyester melt becomes compressible, can absorb pressure variations, and dampens the fiber oscillations that occur during spinning, thus resulting in more uniform fibers. The degree of esterification (U) can be calculated from the saponification number ($V_z$) and the acid number ($S_z$) of the reaction mixture according to the formula $U=(V_z-S_z)\cdot 100/V_z$. The saponification number is determined by saponification with potassium hydroxide in n-propanol and potentiometric titration, and the acid number is determined by potentiometric titration in dimethyl formamide.

According to another especially optimal embodiment of this invention, the amount of poly($C_{2-4}$ alkylene glycol) in the copolyester is 5 to 9 wt %.

The quantity of pentaerythritol to be added is preferably 80 to 200 ppm. In the case of carboxy ethylene phosphonic acid, preferably 500 to 750 ppm is added. Mixtures of both branching components may be added, e.g., 50% pentaerythritol based on 80 to 200 ppm and 50% carboxy ethylene phosphonic acid based on 500 to 750 ppm. If the quantity added is too low, spinnability will be adequate, but the elongation of the POY filaments spun at a high speed will be too low for draw texturing. If the quantity added is slightly too high, the strength of the DTY yarn will leave something to be desired, whereas if the quantity added is substantially too high, the copolyester can no longer be spun well and uniformly. Pentaerythritol and carboxy phosphonic acid compounds are neither volatile nor do they form volatile compounds under the conditions of polyester synthesis, so the metered addition of the compounds can be performed without concern for possible losses. Furthermore, there is no disturbance due to entrained pentaerythritol or carboxy phosphonic acid compounds in recycling unpurified glycol (from the vapors from condensation).

According to another embodiment of this invention, the process is followed by further processing of the copolyester fibers by draw texturing at speeds of at least 500 m/min. Since POY fibers from the copolyester according to this invention, spun at a minimum speed of 3000 m/min, have an elongation at break of at least 130%, they can be processed by draw twisting or preferably by draw texturing methods at speeds of at least 500 m/min, preferably at least 600 m/min, with excellent results to form DT or DTY yarn with a normal elongation (approx. 20–30%) and good strength (approx. 35 cN/tex or more). The excellent drawability of the POY fibers according to this invention permits up to approx. 15% higher spinning throughput by first spinning POY fibers at a higher titer, which is then converted to the nominal titer by a higher degree of drawing in the subsequent drawing operation. Reduced error incidence and increased productivity can even be achieved through further processing by weaving or warp knitting.

Melt spinning can be performed in any known way, e.g., by the method according to U.S. Pat. Nos. 4,940,559 or 5,340,517. The polyester melt can be spun directly after polycondensation or it may first be granulated and the granules melted again before spinning. Draw twisting and draw texturing are performed using conventional equipment, preferably with a high processing speed.

The polyester is produced in a known way by continuous or discontinuous direct esterification of terephthalic acid with $C_{2-4}$ alkylene glycol and subsequent precondensation and polycondensation, wherein poly($C_{2-4}$ alkylene glycol) and the branching component(s) preferably are added jointly or separately to the reaction mixture before precondensation, at the beginning of or during esterification, preferably when 50% to 80% of the carboxyl groups of the polyester-forming dicarboxylic acid(s) are esterified. Condensation is performed in the presence of conventional catalysts, such as antimony, titanium and/or germanium compounds. Delustering agents such as titanium dioxide and optional coloring agents, bluing agents and/or stabilizers may be added to the reaction mixture at any time during polyester synthesis before spinning.

The alkylene groups of the $C_{2-4}$ alkylene glycol and those of poly($C_{2-4}$ alkylene glycol) may be different or preferably the same. The $C_{2-4}$ alkylene glycol is preferably ethylene glycol, and the poly($C_{2-4}$ alkylene glycol) is polyethylene glycol. A small portion of the terephthalic acid and/or the ethylene glycol may be replaced by other dicarboxylic acids and/or diols, such as isophthalic acid, 1,4-cyclohexane dicarboxylic acid, 2,6-naphthalene dicarboxylic acid, p-hydroxy benzoic acid, 4,4'-biphenyl dicarboxylic acid, adipic acid, diethylene glycol, 1,3-propane diol, 1,4-butane diol, 1,4-cyclohexane dimethanol. The amount of these comonomers should not exceed approximately 10 wt % in the polyester because otherwise the fiber properties differ too greatly from those of polyethylene terephthalate fibers. Polyethylene terephthalate is the preferred polyester.

The reaction mixture according to this invention undergoes polycondensation more rapidly than reaction mixtures without the branching components, i.e., the desired final viscosity of the polyester is achieved after a precondensation and polycondensation time that is up to 10% shorter. The accelerated effect with a subsequent optional solid-phase polycondensation is also greatly pronounced.

The object of this invention will be explained in greater detail on the basis of the following examples, which are intended for illustrative purposes only and are not intended, nor should they be construed, as limiting the invention in any manner. Those skilled in the art will appreciate that variations and modifications of the examples presented below can be made without exceeding the spirit or scope of the invention.

EXAMPLES

Examples 1–3

212 kg terephthalic acid, 88 kg ethylene glycol, 5.5 kg 2% antimony acetate solution in ethylene glycol were mixed together homogeneously while stirring. The mixture was fed into an esterification reactor preheated to approx. 265° C., filled approx. 30% with precondensate of the preceding batch and 3 kg 25% titanium dioxide suspension in ethylene glycol within approx. 140 minutes under normal pressure, and esterified for 30 minutes more at 265° C. and normal pressure, separating the reaction water. After 80% of the theoretical quantity of reaction water had distilled off, 13.75 kg polyethylene glycol (400) dissolved in 3.5 kg ethylene glycol was added to the esterification reactor. After adding 14 g phosphoric acid, precondensation was initiated as the pressure dropped slowly to 50 mbar (abs.) and the temperature was increased at the same time to approx. 275° C. within 30 minutes. Approx. 15 minutes before the start of the gradual reduction in the reaction pressure, quantities of pentaerythritol listed in the table below were added, in each case in the form of a hot solution in 1 kg ethylene glycol. The precondensate was fed through a 15 $\mu$m filter into the polycondensation reactor, the pressure lowered to less than 2 mbar (abs.) within 45 minutes, and the actual polycondensation performed at 280° C. according to the following table until reaching the desired intrinsic viscosity. Then the polyester was discharged from the polycondensation reactor within 20 minutes and granulated. The granules were melted in a melt extruder, and the melt was spun at approx. 295° C. through a 34-hole nozzle plate with a nozzle hole diameter of 0.25 mm. The fibers were cooled in a blow shaft with transverse flow and then provided with a preparation (type Zimmer K105) and bundled, passed into a draw-off machine with a 9-fold looped pair of godet rollers and ultimately reeled up. The resulting POY fibers were then draw textured with a friction texturing machine (model BARMAG FK6-S-900 with a 1-7-1 assembly ceramic disk (Ceratex C 0.85 and SPK-C 0.85-M)) at temperatures of 195° C. and 160° C.

of the first and second heating elements, respectively, and a D/Y ratio 1:2.15 and 1:2.2.

Examples 4 and 5

Comparative Examples

In Examples 4 and 5, the same procedure was followed as in Examples 1 to 3, but no polyethylene glycol or pentaerythritol was added in Example 4, and no pentaerythritol was added in Example 5.

The resulting POY fibers are characterized in particular by a lower elongation, which has a detrimental effect on the texturing speed. In addition, the streakiness is increased in the absence of pentaerythritol, and the dye receptivity is dramatically inferior in the absence of polyethylene glycol.

The quantities used and the characteristic values obtained according to Examples 1 through 5 are listed in the following table.

| Example no. | | 1 | 2 | 3 | 4 | 5 |
|---|---|---|---|---|---|---|
| Esterification | | | | | | |
| Polyethylene glycol (400) | kg | 13.75 | 13.75 | 13.75 | — | 13.75 |
| Pentaerythritol | g | 38 | 50 | 62 | — | — |
| Copolyester | | | | | | |
| Intrinsic viscosity | dL/g | 0.65 | 0.63 | 0.67 | 0.65 | 0.66 |
| Diethylene glycol | wt % | 0.8 | 0.8 | 0.8 | 0.7 | 0.8 |
| POY yarn* | | | | | | |
| Spooling speed | m/min | 3200 | 3200 | 3500 | 3200 | 3200 |
| Total titer | dtex | 139 | 139 | 128 | 292 | 292 |
| Elongation | % | 135 | 141 | 141 | 130 | 134 |
| Strength | cN/tex | 21 | 20 | 17 | 23 | 22 |
| DTY yarn* | | | | | | |
| Texturing speed | m/min | 800 | 800 | 800 | 600 | 600 |
| Drawing ratio | 1: | 1.73 | 1.74 | 1.68 | 1.72 | 1.74 |
| Total titer | dtex | 84 | 81 | 80 | 179 | 177 |
| Elongation | % | 26 | 26 | 31 | 22 | 29.2 |
| Strength | cN/tex | 38 | 37 | 30 | 40.2 | 37.7 |
| Dye receptivity | % | 900 | 1300 | 1500 | 100 | 950 |
| Streakiness | level | 2 | 2+ | 2− | 2 | 3 |

*POY = partially oriented yarn
DTY = drawn and textured yarn

The intrinsic viscosity was measured at 25° C. on a solution of 500 mg polyester in 100 mL of a mixture of phenol and 1,2-dichlorobenzene (3:2 parts by weight).

The diethylene glycol content was determined by gas chromatography in an ester exchange mixture of 1 g polyester with 30 mL methanol and 50 mg/L zinc acetate prepared at 200° C. in a Carius tube.

The strength of the fibers and the elongation at break were determined at room temperature on a test length of 200 mm for POY and 500 mm for DTY with a draw-off speed of 2000 mm/min in the case of POY or 1500 mm/min with DTY.

The dye receptivity was determined by producing a round knit tube of fibers of the modified polyethylene terephthalate to be tested as well as standard polyethylene terephthalate. This combined tube was dyed in a dyeing apparatus without a carrier for 30 minutes at 95° C. with 1% Terasil marine blue GRL-C 200% (Ciba Geigy, Switzerland), bath ratio 1:50. The K/S value was determined from the reflectance R, which was measured photometrically, by the following equation according to Kubelka Munk:

$$\frac{K}{S} = \frac{(100-R)^2}{200\,R}$$

The dye receptivity of the yarn to be tested is obtained by comparison with that of the standard material:

Dye receptivity (%)=[(K/S$_{specimen}$)/(K/S$_{standard}$)]·100%

The streakiness, i.e., irregularity in coloration of the dyed tube, was evaluated by passing the dyed tube over a test board and comparing the streakiness with four corresponding standards. Level 1 means "very good" (no streaking) and level 4 means "poor" (severe streaking).

We claim:

1. A process for producing a copolyester fiber, the process comprising fiber esterification, precondensation and polycondensation of terephthalic acid with $C_{2-4}$ alkylene glycol, poly($C_{2-4}$ alkylene glycol), and a polyfunctional compound and spinning in the melt of the resulting copolyester at spooling speeds of at least 3000 m/min, wherein more than 4 wt % up to 12 wt % poly($C_{2-4}$ alkylene glycol) with a number average molecular weight between 200 and 3000 g/mol, and as polyfunctional compound 60 to 260 ppm pentaerythritol, and/or a total of 150 to less than 2500 ppm carboxy methylene phosphonic acid and/or carboxy ethylene phosphonic acid are added to the reaction mixture before precondensation.

2. A process according to claim 1, wherein the poly($C_{2-4}$ alkylene glycol), pentaerythritol and/or carboxy methylene phosphonic acid and/or carboxy ethylene phosphonic acid is added when 50% to 95% of the carboxyl groups of the dicarboxylic acid(s) of the esterification mixture have been esterified.

3. A process according to claim 1, wherein the quantity of poly($C_{2-4}$ alkylene glycol) in the copolyester is 5 to 9 wt %.

4. The process according to claim 1, wherein one or more delustering agents, coloring agents, bluing agents and/or stabilizers are added to the reaction mixture at any time before spinning.

5. The process according to claim 1, wherein the $C_{2-4}$ alkylene glycol is ethylene glycol, 0 to 10 wt % of the terephthalic acid and/or ethylene glycol is replaced by other dicarboxylic acids and/or diols, and the poly($C_{2-4}$ alkylene glycol) is polyethylene glycol.

6. The process according to claim 1, wherein the copolyester fiber is processed further by draw texturing at a speed of at least 500 m/min.

\* \* \* \* \*